United States Patent [19]
Denton

[11] Patent Number: 5,505,525
[45] Date of Patent: Apr. 9, 1996

[54] HUBCAP AND METHOD OF MANUFACTURING THE SAME

[75] Inventor: Dennis N. Denton, Gastonia, N.C.

[73] Assignee: SKF USA Inc., Elgin, Ill.

[21] Appl. No.: 179,532

[22] Filed: Jan. 10, 1994

[51] Int. Cl.[6] ................................................ B60B 7/00
[52] U.S. Cl. ................................ 301/108.4; 301/108.2
[58] Field of Search ........................... 301/108.1, 108.2, 301/108.3, 108.4, 108.5, 64.7, 37.37, 37.1, 37.42

[56] References Cited

U.S. PATENT DOCUMENTS

| | | |
|---|---|---|
| 408,155 | 7/1889 | Wilson ........................... 301/108.2 |
| 3,064,982 | 11/1962 | Stephens . |
| 3,114,579 | 12/1963 | Isenbarger . |
| 3,177,041 | 4/1965 | Isenbarger . |
| 3,316,022 | 4/1967 | Isenbarger . |
| 3,331,638 | 7/1967 | Fruth .............................. 301/108.2 |
| 3,649,080 | 3/1972 | Molinare . |
| 4,073,540 | 2/1978 | Jackowski . |
| 4,834,464 | 5/1989 | Frehse ........................... 301/108.1 |
| 5,024,488 | 6/1991 | Lindhuber et al. ............ 301/108.4 |
| 5,277,479 | 1/1994 | Koyama et al. ................ 301/64.7 |

FOREIGN PATENT DOCUMENTS

| | | | |
|---|---|---|---|
| 74118 | 3/1983 | European Pat. Off. ........... 301/65 |
| 891285 | 3/1944 | France ......................... 301/108.2 |

OTHER PUBLICATIONS

"Sealed For Long Life", CR Services, Brochure #457959 No Date.

*Primary Examiner*—Russell D. Stormer
*Attorney, Agent, or Firm*—James T. FitzGibbon

[57] ABSTRACT

A heavy duty vehicle hubcap preferably made from a plastic material and having a sidewall, an end wall with a transparent window insert formed therein, and further including a radial mounting flange. The mounting flange is reinforced with a mounting ring insert made from a rigid, preferably metal body. The mounting flange and the ring insert include radially elongated bosses and openings. The hubcap also includes an access port formed in the hubcap body sidewall and a plug removably positioned in liquid tight relation within the access port. Preferably, the hubcap is vented to permit passage of gas and vapor therethrough without permitting liquid to pass into the sealed region. An insert molding method is described wherein the ring insert and the window are separately formed and then bonded to the hubcap body.

10 Claims, 4 Drawing Sheets

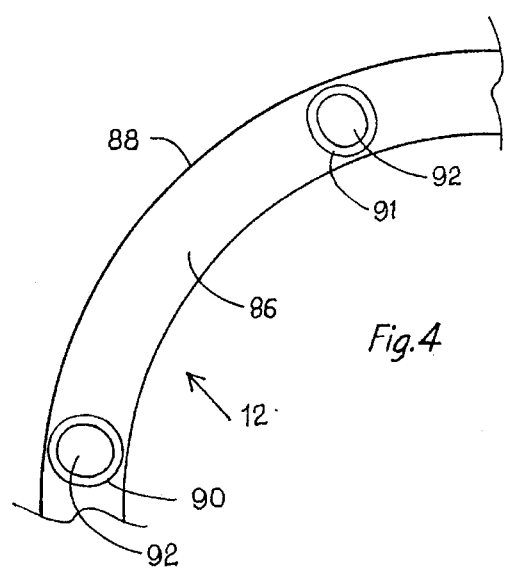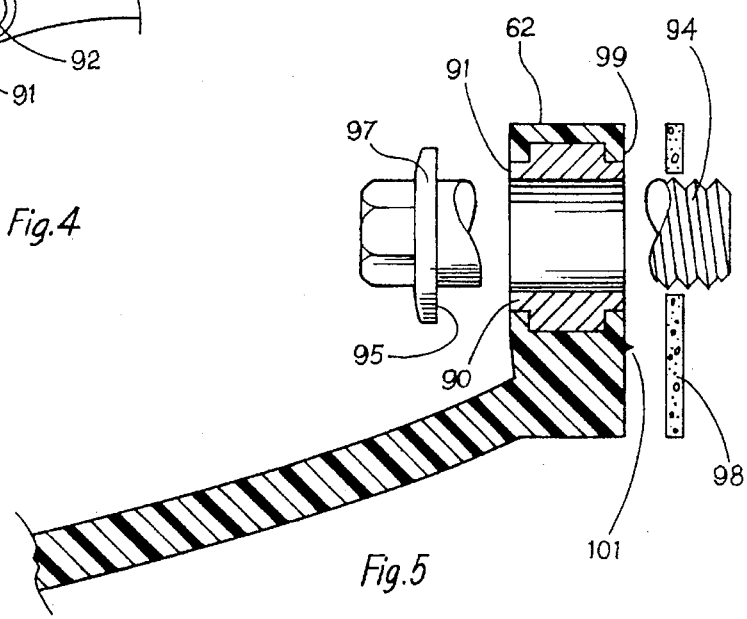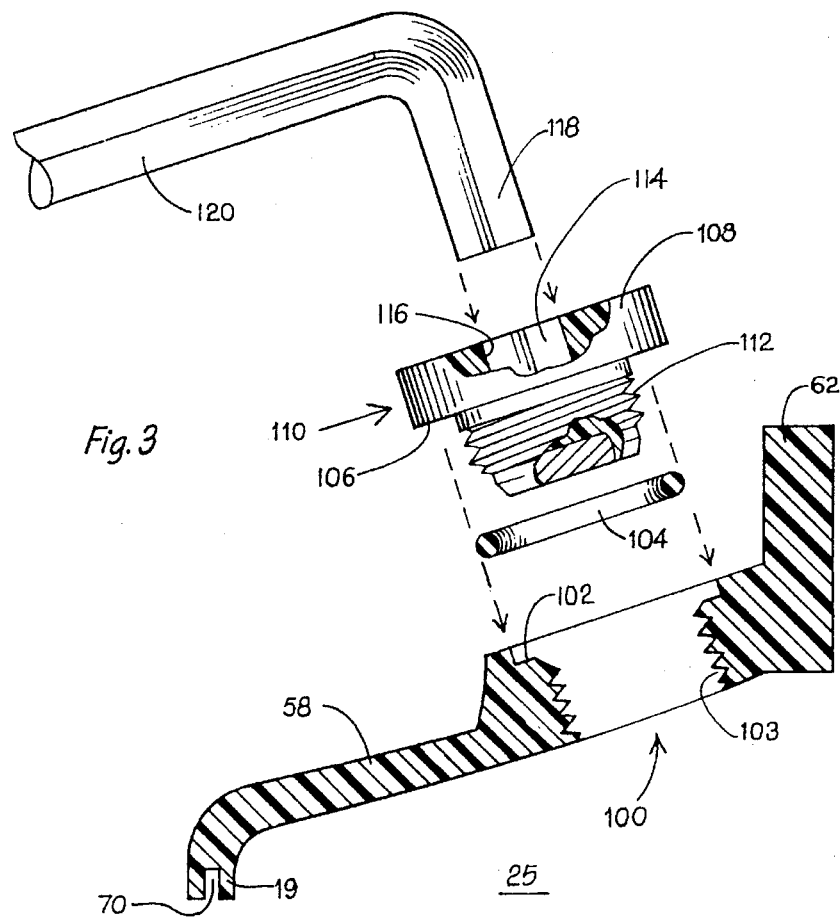

HUBCAP AND METHOD OF MANUFACTURING THE SAME

The present invention relates generally to vehicle components and manufacturing methods, and more particularly to hubcaps for truck, tractor, and semi-trailer wheel assemblies, and methods of making them.

BACKGROUND AND SUMMARY OF THE INVENTION

In automobiles, light trailers, and other light-duty applications, it is common for a wheel bearing assembly to be sealed relatively permanently for all or a good part of the service life of the assembly. Thus, automotive applications, permanently greased bearing assemblies are covered by opaque hubcaps (as opposed to decorative wheel covers which are sometimes incorrectly called hubcaps) which are never removed except for repairs, or for replacement of bearings and/or seals. In most cases, the bearings are permanently lubricated, or are lubricated by a supply of grease coming from another portion of the sealed assembly as a whole.

In the case of large, over-the-road truck tractors and semi-trailers, and other heavy-duty applications, however, the situation is different. Vehicles of these types have extended service lives both in terms of years and in terms of miles traveled. Wheel bearing assemblies are critical components of vehicles such as these. Most commonly, these wheel assemblies include a large, heavy-duty spindle and bearings supportingly engaging one or more rotatable parts, including a rotatable hub portion that in turns supports a brake drum and a removable wheel. In driven wheel applications, the bearings usually rest in the axle housing so that the driving axle is not subject to bending loads. In these cases, while the axle housing takes most or all of the load transmitted from the tires and wheels, and these bearing sets also include one or more oil or grease seals to retain the lubricant within the sealed region, and therefore also require hubcaps.

A number of years ago, many manufacturers and fleet operators, with the aid of bearing and seal suppliers, discovered that the life of ball or roller bearing type assemblies could be extended substantially by using oil rather than grease as the lubricant. Thus, the oil, although more fluent (less viscous) than grease, successfully addressed the problems of flushing dirt from the interfaces between metal parts. Modern oils are also formulated in such a way as to suspend entrained dirt and various other residues within the oil. In this way, as in automotive crankcases or other applications, the oil can be periodically drained and replaced with new, fresh oil, thus removing the grit and contaminants. This concept was brought to practical reality by the development of seals capable of handling low viscosity oils opposed to merely being able to impede leakage of semi-solid or gel materials such as greases.

With the popularization of this concept, hubcaps have been called upon to serve functions in addition to that of merely being a static seal. By "static seal" or "secondary seal," as used herein is meant a seal wherein there is no relative movement of the two or more sealed parts; "primary" or similar expression is applied to a seal application wherein there is relative movements between the sealed parts.

First, the hubcap must be oil-impermeable and provide a positive mechanical barrier against the entrance of contaminants. In addition, the hubcap should be able to provide a transparent window to permit external examination of the sealed region, including the oil level. Moreover, the hubcap should optionally afford means of not only observing, but also replenishing oil so as to maintain a proper oil level in the sealed region.

Preferably, the access plug arrangement should be such that it may provide or be compatible with venting systems and also be constructed and arranged so as to resist accidental or negligent damage removal or disassembly.

Another desirable characteristic in a heavy-duty vehicle hubcap is that of structural strength and integrity, whereby minor collisions with road debris, stones, and the like, or occasional contact with a stationary objects such as posts or curbs in a loading/unloading zone or dock will not damage the hubcap.

Still another desirable characteristic of such a hubcap is that one product be adaptable to several applications. This concept is sometimes referred to as "universality" or "interchangeability." A universal or highly interchangeable part thus simplifies problems of inventory control and stocking, requiring fewer "part numbers" to service a variety of applications than would be the case where each individual application required a different part. Thus, universality lowers not only inventory costs, but also reduces tooling costs and other costs associated with manufacturing the product.

In addition to structural integrity and universality, it is also desirable that the static seal mechanism between the hubcap and the other components be independent of the fasteners in the sense that the fasteners should not be called upon to seal the lubricant or exclude liquid or solid contaminants.

It is also desirable from a design and engineering standpoint that individual components of the hubcap be able to withstand the loads expected to be imposed upon them without being unnecessarily massive in non-load bearing areas.

Another preferred characteristic is that the hubcap be able to be manufactured readily at low cost, and to the extent that different elements of the hubcap are required to be different for different applications, that such elements can be interchanged during the manufacturing process. Thus, for example, if a part that is to accommodate a different bolt shank size or bolt pattern is to be provided, it should be easily interchangeable, as should be the window or the like if it is to provide an access opening of a different size, contour, or inside diameter. The ability to provide a mold and method that will accommodate these changes without requiring any tooling changes, or at least extensive tooling changes, is also advantageous, and, consequently, there is a need for economical, effective methods of making such a hubcap. A satisfactory process would also be able to provide a permanent, liquid-tight bond between mating parts that may be formed separately and incorporated into the product as a whole during what is termed an insert molding operation.

In view of the need to provide a hubcap that will combine a number of desirable advantages and characteristics at reasonable cost and will be compatible with economical manufacture, it is an object of the present invention to provide an improved hubcap for heavy duty applications.

Another object of the invention is to provide a hubcap wherein a single unit is able to be used in a number of applications, including those having bolt circle patterns of slightly different diameters.

A further object of the invention is to provide a method and apparatus for manufacturing an improved hubcap.

A still further object is to provide a hubcap combining improved ruggedness and reliability in use, and able to be made by an economical method.

Yet another object of the invention is to provide a hubcap having a window insert received in an face portion of the cap body to permit viewing into the interior of the sealed region.

Another object of the invention is to provide a hubcap wherein opaque and transparent liquid-retaining portions are integrally bonded to one another in a manner not requiring separate gaskets or seals and being leakfree in use.

A further object of the invention is to provide a hubcap which also includes an opening for replenishing or changing oil or other lubricant, with such opening being sealed by a plug that is resistant to unintentional removal.

Still another object of the invention is to provide a hubcap made from different materials but integrally containing a mounting ring insert or like reinforcing insert made of metal or other material having high strength in compression.

A still further object of the invention is to provide a hubcap manufacturing method which includes placing both metal and non-metal inserts in a mold and simultaneously forming the major portions of a hubcap body and bonding them respectively to a window-forming center element and a metal reinforcing ring serving to define the bolt circle about which the fasteners are inserted when securing the hubcap to the hub or end of the axle housing.

One additional object of the invention is to provide a hubcap having a body made from a rugged and durable, non-brittle material, preferably a reinforced plastic material such as a glass-filled nylon or the like, and incorporating other novel features as well.

A still further object of the invention is to provide a hubcap combining a number of advantageous features and characteristics and which can be manufactured reliably and at low cost.

Yet another object of the invention is to provide a hubcap which simplifies inspection and maintenance of sealed wheel assemblies and, which can be made tamperproof without expensive modification.

The foregoing and other objects and advantages of the invention are achieved in practice by providing a hubcap having a body portion that includes a composite mounting flange, a sidewall with an access port and an end wall having a transparent window insert portion received in the end wall in mechanically interlocked and bonded relation, with the composite mounting flange including a mounting ring insert portion providing contoured openings for receiving removable fasteners. The invention also achieves its objects by providing a novel method of making such a hubcap.

The exact manner in which the foregoing and other objects and advantages of the invention are achieved in practice will become more clearly apparent when reference is made to the following detailed description of the preferred embodiments of the invention described in detail in the following specification and shown in the accompanying drawings, where in like reference numbers indicate corresponding parts throughout.

BRIEF DESCRIPTION OF THE DRAWINGS

FIG. 3 is a vertical sectional view, taken along lines 3—3 of FIG. 1 and showing details of the access port and the plug associated therewith;

FIG. 4 is a fragmentary top plan view of a portion of the mounting ring insert forming a part of the hubcap of the invention;

FIG. 5 is a fragmentary, enlarged sectional view of a portion of the mounting ring of FIG. 4, showing the same in position of use within the mounting flange portion of the hubcap;

DESCRIPTION OF THE PREFERRED
EMBODIMENTS OF THE INVENTION

While the invention is capable of being embodied in different forms, a description of a preferred embodiment thereof will be given wherein the application is that of a hubcap for a trailer or semi-trailer hub assembly.

Figure 1:
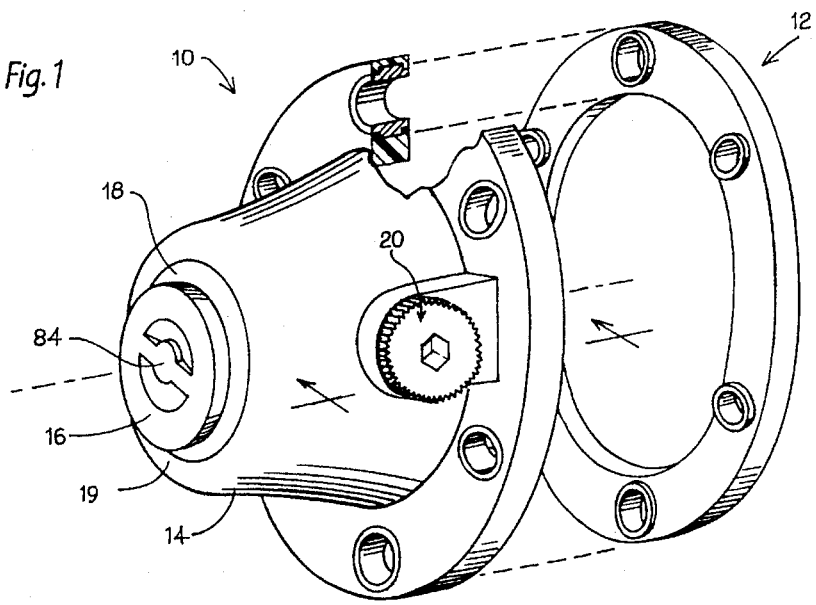
FIG. 1 is a perspective view of the improved hubcap of the invention, showing certain parts thereof in an exploded relation.

Thus, referring to the drawings in greater detail, FIG. 1 shows a hubcap assembly generally designated 10 of the invention and showing the same to include a number of principal components including a mounting ring insert generally designated 12, a hubcap body generally designated 14 and further showing a removable vent plug generally designated 16 positioned within a transparent window insert generally designated 18 forming a part of the end wall 19 of the hubcap 10. An access port and plug assembly generally designated 20 is also shown to be provided for access to the interior of the hubcap 10.

Figure 2:
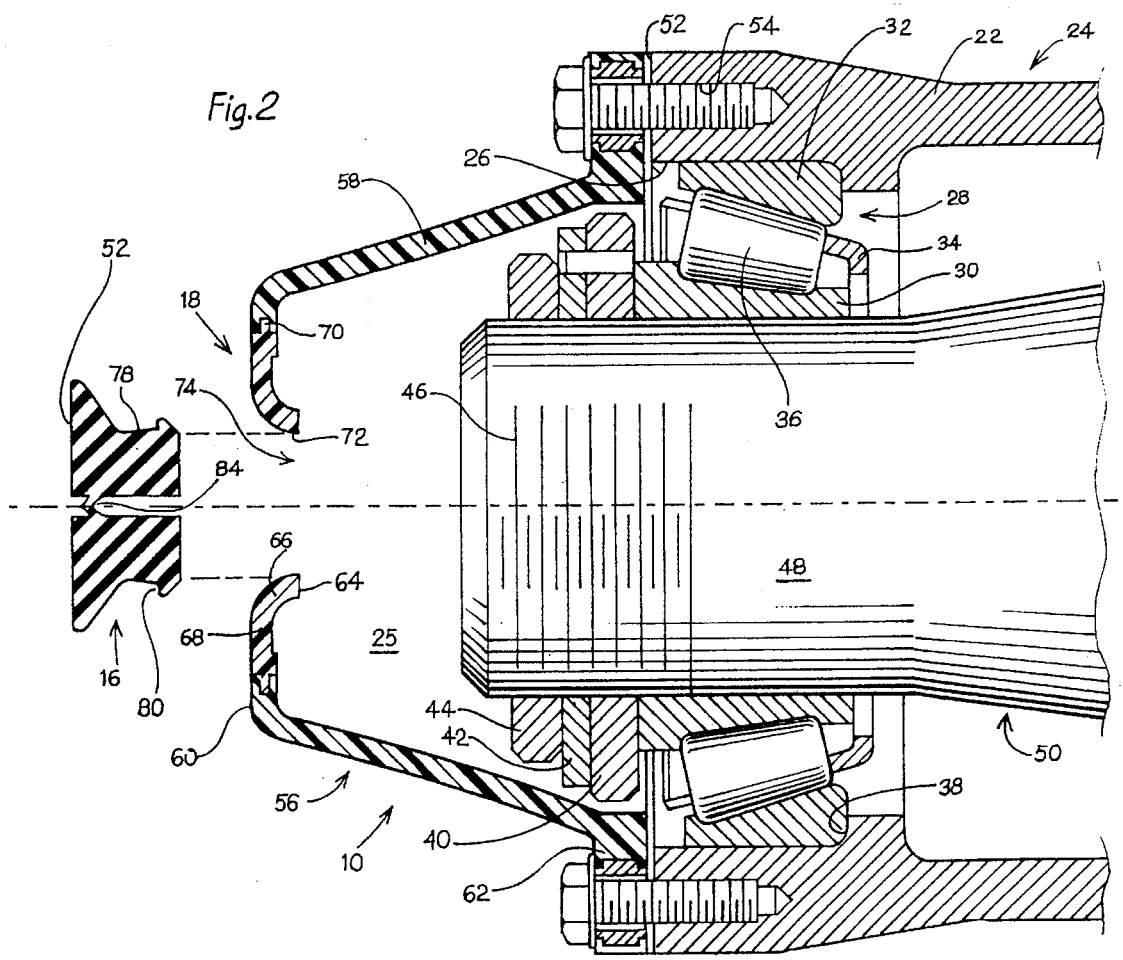
FIG. 2 is a vertical sectional view of a portion of the hubcap of the invention, showing the mounting ring insert embedded within a mounting flange portion of the hubcap assembly.

Referring now also to FIG. 2, a typical application of the inventive hubcap 10 is shown. Here, the hubcap 10 is shown as being affixed in place over an end portion 22 of a wheel hub 24 so as to define a sealed region 25 which serves to receive and retain oil or other lubricant. The hub 24 includes a bearing counterbore 26 in which a tapered roller bearing assembly generally designated 28 is received and which is shown to include inner and outer races 30, 32, and a cage 34 positioning a plurality of tapered bearing rollers 36.

The inner race is kept in snug relation to the shoulder 38 of the counterbore 26 by a ring unit 40 backed by a spacer 42 against which a locking nut 44 is positioned. The nut 44 is threaded internally to engage cooperating threads 46 on the reduced diameter end portion 48 of a spindle generally designated 50. The end face 52 of the hub 24 is faced off and includes a plurality of tapped bolt-receiving holes 54 arranged in a circular pattern when reviewed from the end. A sealing gasket (98 in FIG. 5) of conventional design and made from a compressible material is received in use between the hub end face 52 and the hubcap mounting flange to be described.

The hubcap assembly 10 includes a number of components, including a main body portion generally designated 56, which in turn is shown to include tapered sidewalls 58, the outer end wall 19, and an axially inner composite mounting flange 62, so-called because it has embedded therein the rigid mounting ring insert 12. The hubcap assembly 10 further includes the transparent window insert 18 that is shown in FIG. 2 to include a window center section 68, a peripheral tongue 70 contained within and bonded to an inner margin 60 of the end wall 19. The window insert 18 also includes an inturned inner flange 66 having an end face surface 64 joined to a tapered wall portion 72 that acts as a pilot or centering surface for the window insert 18 during the molding operation to be described.

The surfaces 64, 72 define a center opening generally designated 74 which is closed off by the vent plug 16 which is preferably made from a rubber or other flexible material. A cylindrical surface 78 and a shoulder 80 on the plug 16 serve to locate the plug 16 within the opening 74. An outer end face 82 of the plug 16 may contain an opening for the vent assembly 84 which extends axially through the plug 16 near the center line thereof. FIG. 2 shows the vent as being in the form of a duckbill valve located in a central vent passage extending through the plug 16.

Figure 6:
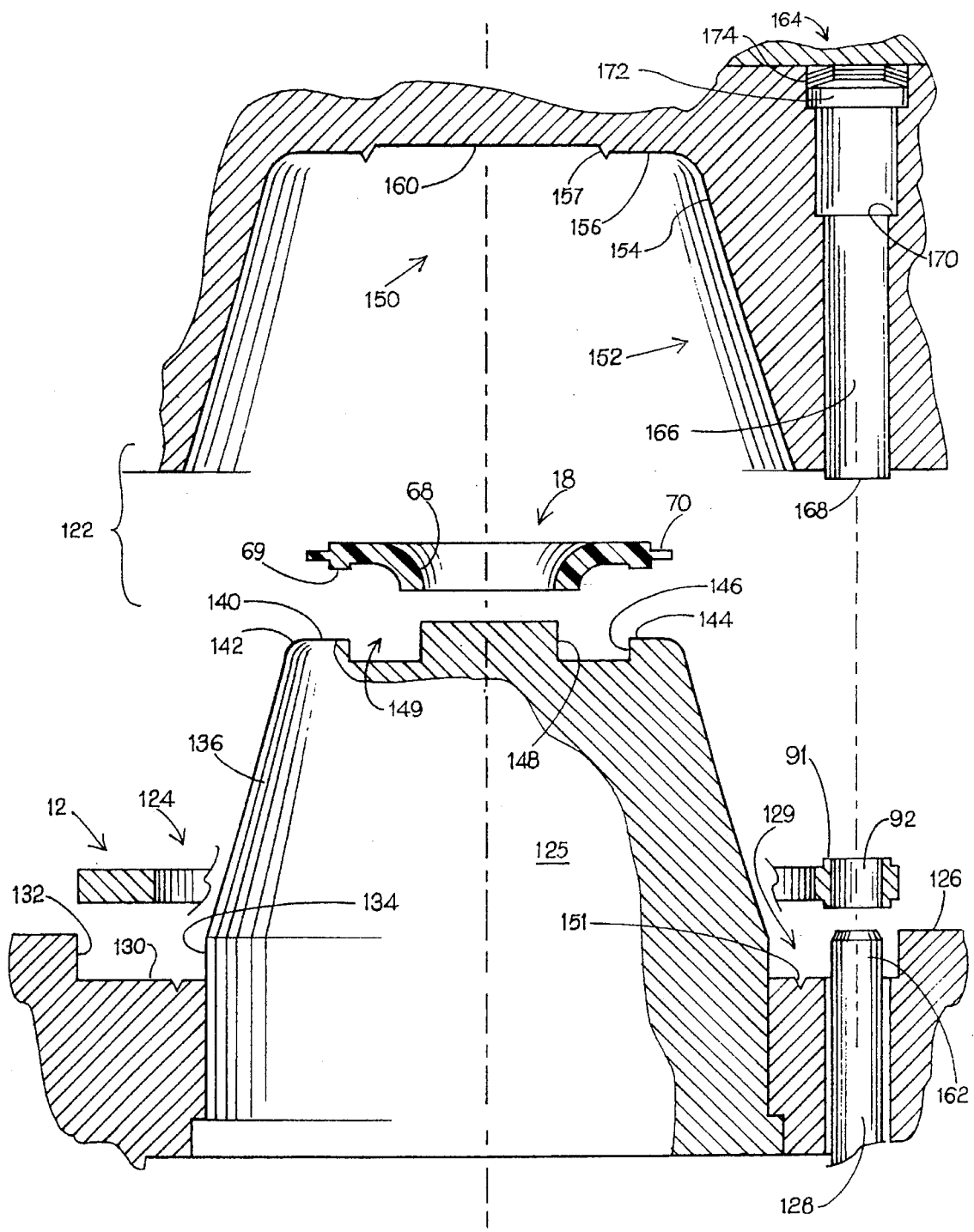
FIG. 6 is a vertical sectional view of a mold of the type used to make the hubcap of the invention, and showing the same in an open position with the mounting ring and window inserts in exploded relation.

As is shown in FIGS. 1 and 2, also in FIGS. 4 and 5, the mounting ring insert 12 includes a main body portion 86 in the form of a ring having an outer diameter cylindrical surface 88 of a short axial extent. The ring insert body 86 includes bosses 90 that define each of the bolt-receiving openings 92 in the ring 12. Each boss also has a flat end face 91, as shown in FIGS. 1, 5, and 6, for example. As best shown in FIG. 5, when the fastening bolts 94, preferably flange bolts, are inserted in place, the inner end faces 95 of the bolt flanges 97 engage the end face surfaces 91 of the bosses 90 so as to transmit forces therethrough and into the end faces 52 of the gasket and/or hub 24. The compressible gasket 98 is positioned in use, between the inner end face surface 99 of the mounting flange 62 and the outer end face 52 of the hub 24. Because the inner end face 99 of the mounting flange also includes a sealing rib or land 101, the forces on the gasket are localized to produce a highly liquid-tight seal.

FIGS. 5 and 6 show details of the bolt-receiving openings 90 and the bosses 92, showing that a flange bolt or the like may be used to insure that the axial end face load is transmitted entirely through the metal or other material comprising the insert 12 rather than through the plastic material comprising the mounting flange 64.

Referring now to FIG. 3, certain constructional details of the access port 20 are shown. As illustrated, an opening 100 is defined by a threaded sidewall 103 extending from the inner to the outer surfaces of the tapered sidewall 58 of the hubcap 10 and spaced axially outwardly from the mounting flange 62. An end face 102 is formed at the outer end of the sidewall 103, and a sealing 0-ring 104 bears on this face when urged into position by an opposing end face 106 on the axially inner surface of the head 108 of an access port plug generally designated 110. The plug 110 also includes a threaded shank portion 112 and a contoured recess 114 defined by sidewalls 116 in a hexagonal or other selected shape designed to accommodate the end portion 118 of an allen wrench or other special tool. In the preferred form of product, the allen wrench 120 is needed to remove the plug, which permits an additional supply of lubricant to be added to the sealed region 25 lying inside the wheel hub, the hubcap and the bearing assembly 28.

When it is desired to remove the oil from the sealed region 25, this may be accomplished by removing the plug 110 and rotating the hub so that the hubcap 10 faces down. The opening 100 then serves as a drain port for emptying some or all of the oil in the sealed region 25. In the alternative, the hubcap 10 may be removed altogether or loosened about the bolt circle to permit the contaminated oil to drain from the sealed region 25.

Figures 7, 7A:
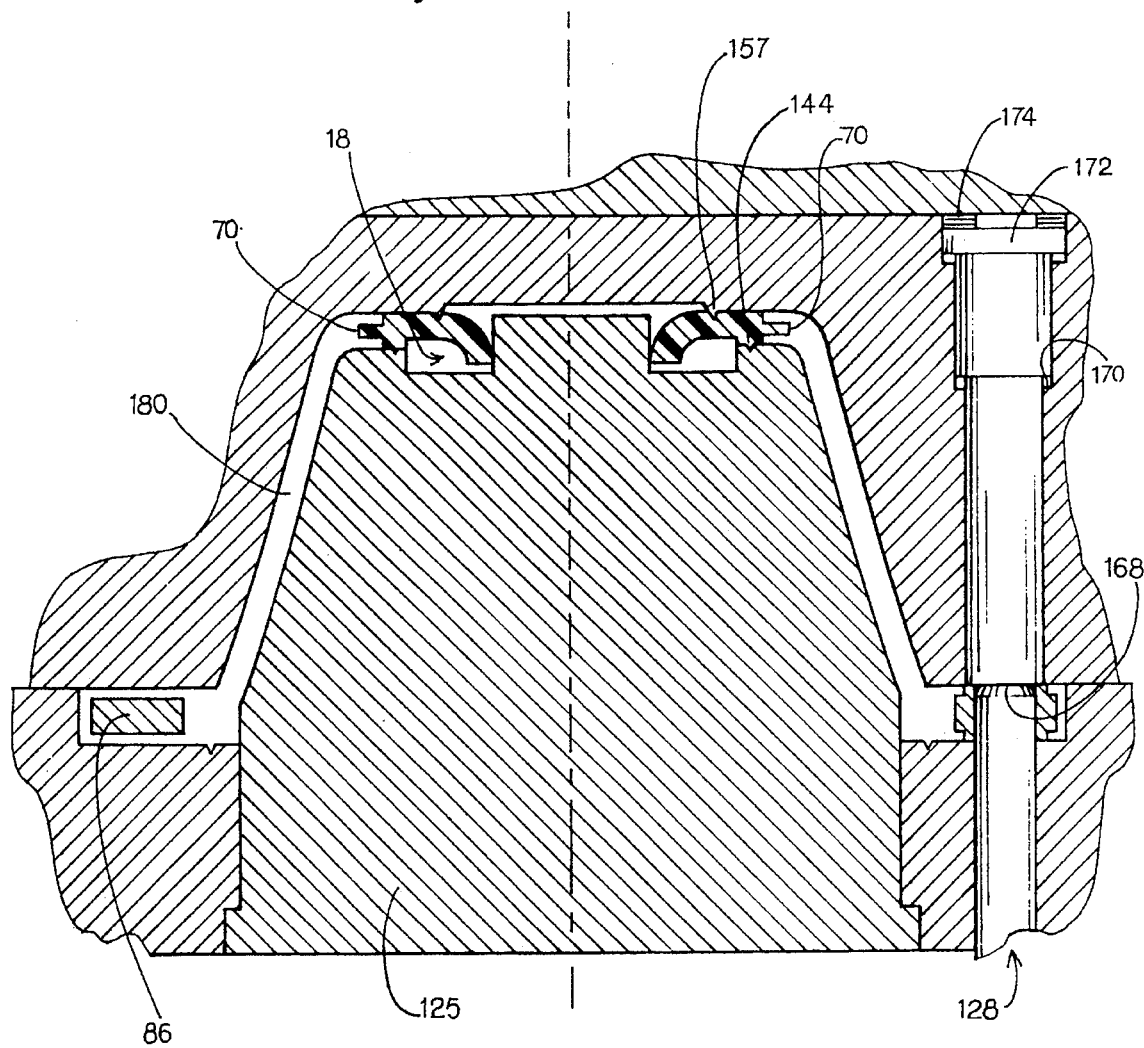
FIG. 7 is a vertical sectional view of the mold elements of FIG. 6, showing the mold in the closed position thereof.
FIG. 7A is a fragmentary vertical sectional view of a portion of a modified form of window insert able to be used with the hubcap of the invention.

An important feature of the hubcap of the present invention is the provision of the window 18 in the end wall 19, and the mounting ring insert 12 in the mounting flange 62 of the hubcap 10. Referring to FIGS. 6 and 7, a preferred method of manufacturing such a hubcap so as to incorporate the window 18 and the mounting ring insert is shown.

In FIG. 6, the principal elements of a mold assembly generally designated 122 and adapted for use in making the hubcap of the invention are shown. FIG. 6 also shows the window insert 18 and the mounting ring insert 12.

Referring now to the mold assembly 122, this unit is shown to include a lower mold half portion generally designated 124, which includes a lower insert or core 125, an outer section 126, and a plurality of mounting ring insert guide pins 128. As shown, the outer section includes a circumferentially extending groove 129 defined by a bottom wall 130 and a circumferential outer sidewall 132. The mold insert 125 includes a lower, circumferential sidewall 134, an intermediate, tapering sidewall 136, a rounded corner section 142, and an upper end face portion 140. The upper end face of the core 126 includes an insert support surface 144, a circumferential outer wall surface 146, and an inner wall 148 serving as a pilot or registration surface for positioning to window insert 18. These surfaces collectively define a window insert-receiving groove 149. A groove 151 is provided in the bottom wall 130 so as to form the sealing rib or land 101 in the flange 62.

The upper mold half generally designated 150 includes a generally downwardly facing, contoured inner surface generally designated 152 and shown to include a tapered continuous sidewall 154, an upper, outer end face 156, a pinch-off land 157 and a relieved center section 160.

FIG. 6 shows that, with the mold open, the window insert 18 is positioned in such a way that its inner margin 68 registers with the post formed by the inner wall 148 of the groove 149. The lower surface 69 of its outer margin is supported on the insert support surface 144. S The pinch-off land 157 is directly above the center of this surface 144.

FIG. 6 also shows how the mounting ring insert 12 is positioned for insertion. Here, the openings 92 in the ring insert 12 are aligned with the shanks 162 of the lower guide pins 128. The upper mold half 150 also includes a spring loaded flash prevention assembly generally designated 164, and shown to include a slidable pin 166 having a squared-off lower end face surface 168, a stop shoulder 170, an enlarged head 172, a stack of belleville washers 174 biasing the pin 166 downwardly so that surface 168 extends just out of the upper mold half 150.

FIG. 7 shows the mold assembly in a position of use just prior to injection of the fluent plastic to complete formation of the hubcap. As shown in FIG. 7, the inserts, namely, the mounting ring insert 12 and the window insert 18 are positioned within the lower mold half, and the upper mold half 152 has moved to the closed position. In this position, the pinch-off land 157 has engaged the upper surface 176 of the window insert 18 near its outer margin and the lower surface 69 is engaged by the support surface 144. The elements cooperate to form a flash barrier that will prevent movement of fluent plastic radially inwardly thereof.

Regarding flash control around the ring 12, this is accomplished when the mold is closed. Here, just before the mold closes, the end face 168 of the pin engages the end face surface 91 of the boss 90. Continued downward movement of the upper mold half 150 cause the pin 166 to compress the belleville springs or washers 174 and slide upwardly. The pin stop shoulder moves away from its seat, but the force of the spring stack 174 prevents flash from flowing into the bolt holes 92 inside the bosses 90.

With the mold being closed, the various counterpart surfaces on the upper and lower mold halves are spaced apart from each other by a distance equal to the thickness of the parts to be formed, thus forming a cavity 180 into which fluent plastic material may be injected or otherwise forced to flow.

As is also shown, the tongue 70 of the window insert 18 extends well into the mold cavity 180, exposing plural surfaces for bonding to the fluent material that will fill the cavity 180. This fluent material also surrounds the mounting ring insert 12 which is positioned by the pins 128, thereby forming the remainder portion of the composite mounting flange 62.

When the mold is closed and the flash barriers are established, fluent, hardenable plastic material is injected therein and assumes the shape of the cavity, which is the shape that the final hubcap 10 will have when removed from the mold. After a short cooling period, the mold is opened and the completed product is removed.

Some elements of the mold, such as springs or the like for maintaining the force on the closed mold, and the various runners, sprues, gates, etc. for the mold are of the type well known to those skilled in the art, and a detailed description thereof not being necessary to a full understanding of the invention, further description thereof is omitted.

FIG. 7A shows that the tongue 70 of the window insert may have auxiliary formations, such as the circumferential rib 182, to provide further mechanical bonding between the window insert 18 and the remainder of the hubcap 10.

Referring now to the materials used to form the product, it is preferable in the interest of strength, to use a colored, glass-filled nylon material to form the body of the hubcap 10. However, other suitable materials may be selected for use, including, but not limited to, polycarbonates or the like, or other strong materials, particularly including those that are susceptible to the inclusion of reinforcing fillers.

Preferably, the window 18 is made from a transparent nylon, and it is preferred that the material from which the window is made be chemically similar or at least compatible with the material from which the remainder of the hubcap is made so that a strong, liquid-tight bond may be formed between the window and the remainder of the hubcap end face. Regarding the reinforcing ring insert, this is preferably made from a die cast aluminum material. However, primary requirements, namely that of being able to bond with the plastic material and possessing significant compressive strength are the only real limitations to this material. Besides a die cast aluminum, a metal ring insert may be made using powder metallurgy, for example. The ring may also be made from a steel or non-ferrous material. As an alternative, it is considered within the scope of the invention to form the mounting flange ring insert from a plastic material, preferably a strong structural plastic. Such a component, when made from a strong, preferably filled material, is made by injection or transfer molding.

Regarding the removable plug blank associated with the access port blank, a shouldered plug is illustrated as being seated on an end face of the threaded bore of the hole. A protective counterbore or countersink may be provided to accommodate the plug, and a specialized fastener may be used to insure that the design is substantially tamper-proof. In such a case, a companion tool would be provided. By way of illustration, the recess 114 might be of a pentagonal cross-section, requiring a special tool for removal and, with the head being fitted within a counterbore, such a tamper-proof characteristic can be assured as a practical matter.

It will thus be seen that the present invention provides a novel hubcap assembly and method for making the same, having a number of novel advantages and characteristics, including those referred to specifically herein and others which are inherent in the invention. A preferred form of hubcap and method of making it having been described in detail, it is anticipated that the variations in the described form of construction and method may occur to those skilled in the art, and that variations and modifications to the product and method may be made without departing from the spirit of the invention or the scope of the appended claims.

I claim:

1. A hubcap assembly comprising, in combination, a hubcap body having sidewall, end wall and mounting flange portions, said end wall including a transparent window insert portion bonded to and mechanically interlocked along a generally circular locus to an inner margin of said end wall portion, with said mounting flange portion having axially inner and outer end face surfaces and being of a composite construction that includes a rigid mounting ring insert portion and a flange remainder portion, said mounting ring insert being bonded to and surrounded by the plastic material from which said flange remainder portion and said hubcap sidewall portions are formed, with said mounting ring insert comprising a ring-shaped body and further including opening-defining bosses having end faces substantially flush with said axially inner and outer end face surfaces of said flange remainder portion of said mounting flange, said opening defined by said bosses being of an oval configuration with their respective long axes extending radially from the center of said hubcap, and with said hubcap further including an access port and plug therefore, said access port comprising an opening in said sidewall and said plug being removably received in said sidewall opening in snug, liquid-tight relation, said plug having means permitting intentional removal thereof; and with said hubcap body and said window insert being made from stiff, resilient, impact-resistant thermoplastic materials.

2. A hubcap assembly as defined in claim 1 wherein said window insert includes an inner, inturned margin portion defining a center opening, said hubcap further including an elastomeric plug for said opening.

3. A hubcap assembly as defined in claim 2 wherein said plug further includes a two-way vent adapted to maintain a substantially atmospheric pressure within a machine housing sealed by said hubcap.

4. A hubcap assembly as defined in claim 1 wherein said access port is defined by a threaded sidewall portion and wherein said plug includes cooperating threads, and a head portion having exterior circumferential serrations and a center socket adapted to receive a complementary tool.

5. A hubcap assembly as defined in claim 1 wherein said plug assembly further includes an O-ring gasket associated therewith and received in use between opposing end faces of said sidewall and an end face seal surface on said plug.

6. A hubcap assembly as defined in claim 1 wherein said window insert is made from a clear thermoplastic material.

7. A hubcap assembly as defined in claim 1 wherein said mounting ring insert is made from aluminum.

8. A hubcap assembly as defined in claim 1 wherein said thermo plastic material comprising said hubcap body is reinforced with finely divided glass fibers.

9. A hubcap assembly as defined in claim 1 wherein said mounting flange includes a circumferentially continuous rib adapted to engage an associated gasket, said rib lying radially inwardly of the innermost portions of said fastener openings.

10. A hubcap assembly as defined in claim 1 wherein said mechanically interlocked portions of said window insert and said inner margin of said hubcap body end wall include tongue and groove portions.

* * * * *